May 26, 1936. W. WITTE 2,042,033
DECORATING FABRIC
Filed Sept. 24, 1934
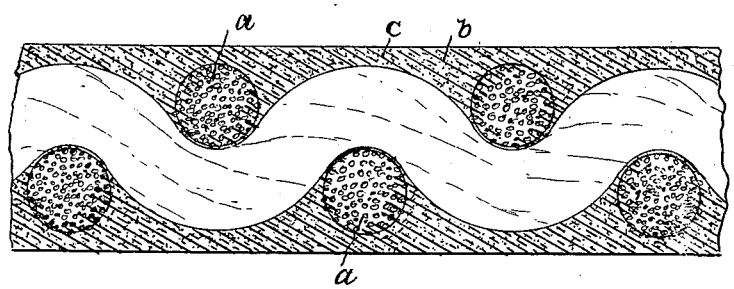
INVENTOR,
William Witte.
BY
ATTORNEY Patented May 26, 1936

2,042,033

UNITED STATES PATENT OFFICE 2,042,033

DECORATING FABRIC

William Witte, Glen Rock, N. J., assignor to National Dyeing & Printing Company, Paterson, N. J., a corporation of New Jersey Application September 24, 1934, Serial No. 745,284

3 Claims. (Cl. 91—68)

I have sought by this invention to provide a composite product comprising a fabric and a light-emitting substance in the form of a phosphorescent powder so that in the dark, after exposure to light, the product will emit some color or shade, and to have such product not substantially different from the naked fabric as to feel, physical appearance, thickness, flexibility—or non-impairment of the draping quality—of the naked fabric, and resistance to moisture and heat (as in washing and ironing) and to have also a permanent or substantially integral association of its constituents.

A product answering this description is shown more or less diagrammatically, in section and magnified, in the accompanying drawing where $a$ designates strand-groups each forming a thread of the fabric (here woven) and $b$ a substance associated with the fabric, as will appear.

The fabric may be any fabric, but I have particularly in mind fine fabrics, of silk, wool, cotton, synthetic and other fibrous threads, such as are used for aesthetic purposes, as dress-goods, draperies and the like where the draping and other qualities characteristic of the naked fabric are to be preserved.

The substance $b$ comprises an elastic carrier, of rubber, and a phosphorescent powder, preferably sulphide of zinc or cadmium, these being recognized to be perfectly harmless and being known to emit in the dark, after exposure to light, any color or shade in the color spectrum, depending on the amount of a certain chemical present therein.

The powder, indicated by dots $c$, exists dispersed and immured in the carrier, and the substance formed by them exists as a membrane of substantially the same thickness as the fabric itself, penetrating the fabric to substantially the full thickness thereof and immuring all its threads independently of each other in the area occupied by said substance and actually extending more or less deeply between the strands of and thus impregnating the threads. Further, said substance is so flexible that the product has not appreciably less flexibility than the naked fabric.

Usually the illustrated and described association of said substance with the fabric will be effected by a printing pressure step, but of course it may be accomplished otherwise as by immersion. When effected by printing it should in its initial state be capable of being readily and evenly applied to the printing surface, to print sharply and to be liberated from such surface when the latter withdraws after effecting the printing, while in its final state, or when it sets, having the qualities already indicated. For these purposes I have followed this procedural example:

Having two rubber compounds which I term compounds A and B and which as I obtain them from the manufacturers thereof are flexible and elastic rubber solids (compound A containing latex crepe—93.3%, kerosene—1.9% and zinc oxide—4.8% and sufficient sulphur and accelerator to effect vulcanization, and compound B containing long milled latex crepe—93.45%, kerosene—4.67% and zinc oxide—1.88% and sufficient sulphur and accelerator to effect vulcanization) I prepare an 8% solution of compound A, using gasoline as the solvent, and a 13% solution of compound B, using kerosene as the solvent, and thereupon these solutions are mixed with gasoline, kerosene, the phosphorescent powder and cotton seed oil so that on thoroughly mixing these ingredients will exist in these proportions:

| | Per cent |
|---|---|
| Compound A | 2.9 |
| Solvent, gasoline | 33.2 |
| Compound B | 1.17 |
| Solvent, kerosene | 7.93 |
| Solvent, gasoline | 19.8 |
| Solvent, kerosene | 2.8 |
| Phosphorescent material, sulphide of zinc or cadmium in comminuted form | 28.2 |
| Cotton seed oil | 4 |
| | 100 |

In the resulting mixture the liquid content predominates so that the mixture has not less liquidity than, for example, honey, or the consistency of a thin paste used for printing with a screen-stencil of fine-mesh bolting cloth. In this form it is adapted to be readily and evenly applied to a printing surface and to pass through the interstices of and thus penetrate the fabric uniformly and completely, even impregnating the threads thereof somewhat as indicated, when applied thereto by printing pressure.

It will be understood that in addition to gasoline as a solvent I use kerosene because the evaporation rate of the gasoline is too speedy to permit the proper printing consistency of the substance to be maintained for sufficient time for practical application; in short, the kerosene slows down the evaporation rate to meet the conditions necessary for application. The cotton seed oil acts as a lubricant facilitating application of the mixture to the printing surface and its penetration of the fabric.

After the printing the product may be treated in any way known to rubber manufacturers to effect aging or curing of the rubber constituent, i. e., using steam, dry heat or atmospheric aging or curing.

For causing the fabric to emit in normal illumination the same color or shade as or a different color or shade from that emitted by the phosphorescent material in the dark I may include in the mixture or paste a small quantity (as up to 1%) of a color material, or dye, using some oil-soluble dye because it is soluble in the same solvent as the rubber, for instance, any of the following (see Society of Dyes and Color Index, 1st Ed., 1924):

| | |
|---|---|
| Oil blue | 1289 |
| Oil brown | 81 |
| Oil scarlet | 248 |
| Oil yellow I | 17 |
| Ultramarine blue | 1290 |
| Ocher | 1267 |
| Emerald green | 1292 |
| Iron oxide | 1276 |
| Vermilion | 1280 |
| Cadmin yellow | 1272 |
| Titanox | 1264 |
| Lithopone | 1259 |

It is to be understood that so long as the product is as defined in the appended claims it may be produced otherwise than by following the example above given.

I am not unaware that it has been suggested in this art that light-emitting, as phosphorescent, material may be applied to a fabric. But I know of no instance in which this has been done in such a way that the association of the fabric and said material is such as to form the substantially integral and thus permanent union thereof and the dispersion of the light-emitting material throughout the carrier which characterize my invention and at the same time produce a product which shall have the desirable qualities herein set forth.

It is not to be overlooked that when volatilization of the solvent content of the mentioned substance or paste has been completed so that the latter exists in its ultimate or solid form the predominating content of the substance is then the powder, and since the latter is dispersed in the carrier it follows that the carrier exists as a cellular structure having cells which are thin-walled and occupied by the powder particles. This structural feature I claim whether or not said substance penetrates the fabric to its full thickness, whether or not rubber is used as the principal constituent of the carrier, and whatever the light-emitting bodies are which fill the cells.

The present application is a continuation in part of my application Serial No. 629,999.

Having thus fully described my invention what I claim is:

1. The herein described composite product comprising a fabric, a transparent flexible rubber carrier penetrating the fabric as to a given area and to substantially the full thickness of the fabric, and a light-emitting powder dispersed and immured in the carrier.

2. The herein described composite product comprising a fabric and a substance penetrating the fabric as to a given area and to substantially the full thickness of the fabric and having such degree of flexibility that the flexibility of the product is not substantially less than that of the naked fabric, said substance comprising a rubber carrier and a light-emitting powder dispersed and immured in the carrier.

3. The herein described composite product comprising a fabric, a transparent flexible rubber carrier penetrating the fabric as to a given area and to substantially the full thickness of the fabric and immuring substantially all the threads thereof independently of each other in such area, and a light-emitting powder dispersed and immured in the carrier.

WILLIAM WITTE.